United States Patent [19]

Piper

[11] Patent Number: 5,205,325
[45] Date of Patent: Apr. 27, 1993

[54] FLOW CONTROL VALVE

[75] Inventor: Britton F. Piper, Edmond, Okla.

[73] Assignee: Piper Oilfield Products, Inc., Oklahoma City, Okla.

[21] Appl. No.: 791,069

[22] Filed: Nov. 12, 1991

[51] Int. Cl.⁵ .................................... F16K 15/14
[52] U.S. Cl. ................. 137/844; 137/853; 175/317; 251/5
[58] Field of Search ............ 137/844, 853; 251/5; 175/243, 317, 318

[56] References Cited

U.S. PATENT DOCUMENTS

| | | | |
|---|---|---|---|
| 2,653,009 | 9/1953 | Ragland . | |
| 2,945,665 | 7/1960 | Regan et al. . | |
| 3,342,215 | 9/1967 | Griffin, III . | |
| 3,365,009 | 1/1968 | Burnham | 251/5 X |
| 3,494,588 | 2/1970 | Kisling, III . | |
| 3,566,964 | 3/1971 | Livingston . | |
| 3,703,213 | 11/1972 | Kammerer et al. | 175/318 |
| 3,955,594 | 5/1976 | Snow . | |
| 4,303,100 | 12/1981 | Kalb | 137/853 |
| 4,465,258 | 8/1984 | Weingarten | 251/5 |
| 4,630,635 | 12/1986 | Bernstein | 251/5 X |
| 4,811,758 | 3/1989 | Piper | 137/844 |

FOREIGN PATENT DOCUMENTS

| | | |
|---|---|---|
| 1056721 | 6/1979 | Canada . |
| 0029396 | 5/1981 | European Pat. Off. . |
| 1476473 | 2/1967 | France . |
| 1206721 | 9/1970 | United Kingdom . |

*Primary Examiner*—Robert G. Nilson
*Attorney, Agent, or Firm*—Glen M. Burdick

[57] ABSTRACT

A flow control valve assembly is provided which, when connected to a rotatable drill string, prevents drainage of fluid from a standpipe and rotary hose of a drilling rig when fluid flow through the drill string is interrupted. The flow control valve assembly comprises a tubular body member or housing having a fluid flow passage extensive therethrough and a flow control valve supported within the fluid flow passage of the tubular body member. The flow control valve, which is a self-contained pressurized unit, is provided with an annular pressure cavity so that the flow control valve can be selectively opened and closed in response to pressure differential between the annular pressure cavity and the pressure of fluid in the fluid flow passage of the tubular body member.

19 Claims, 5 Drawing Sheets

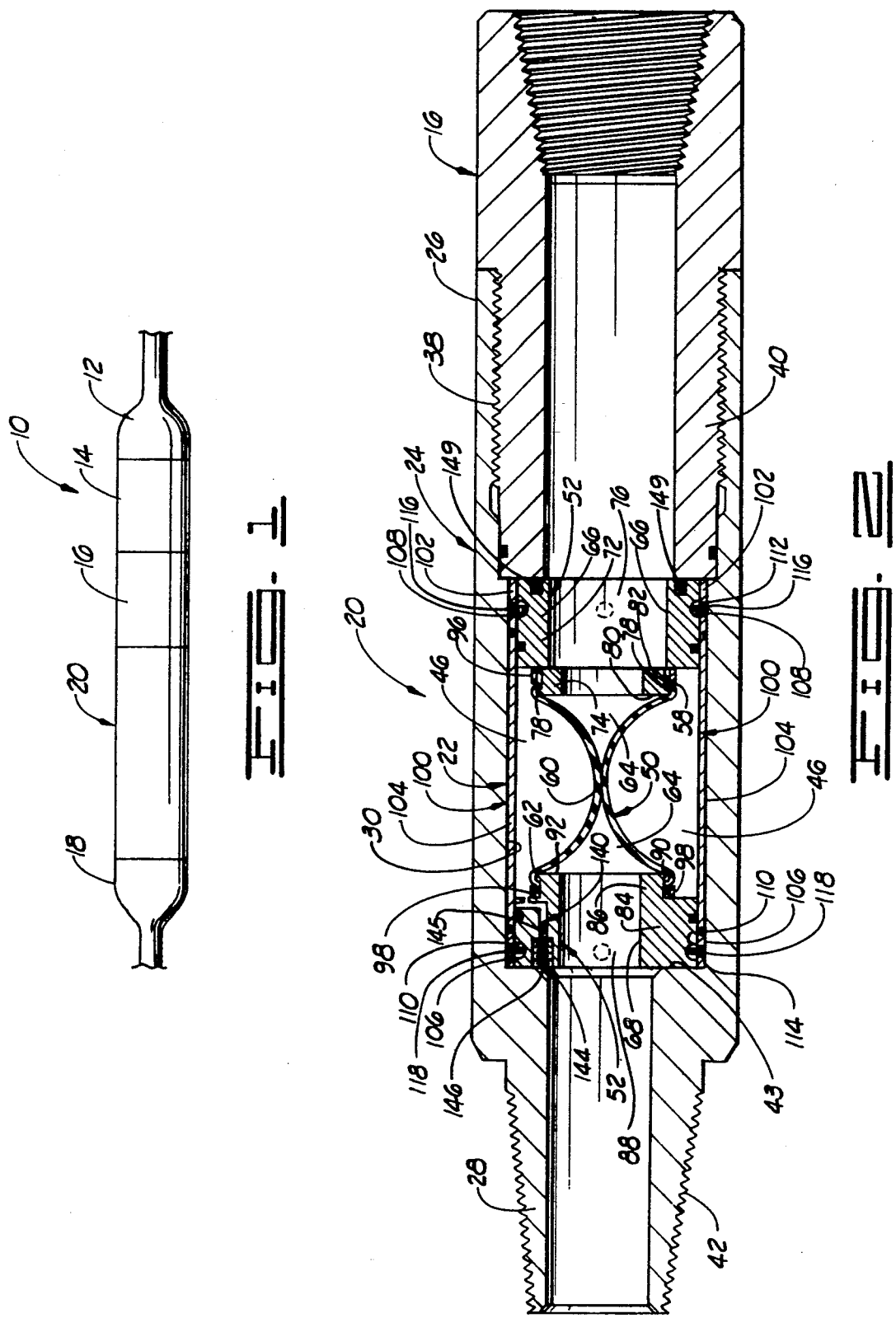

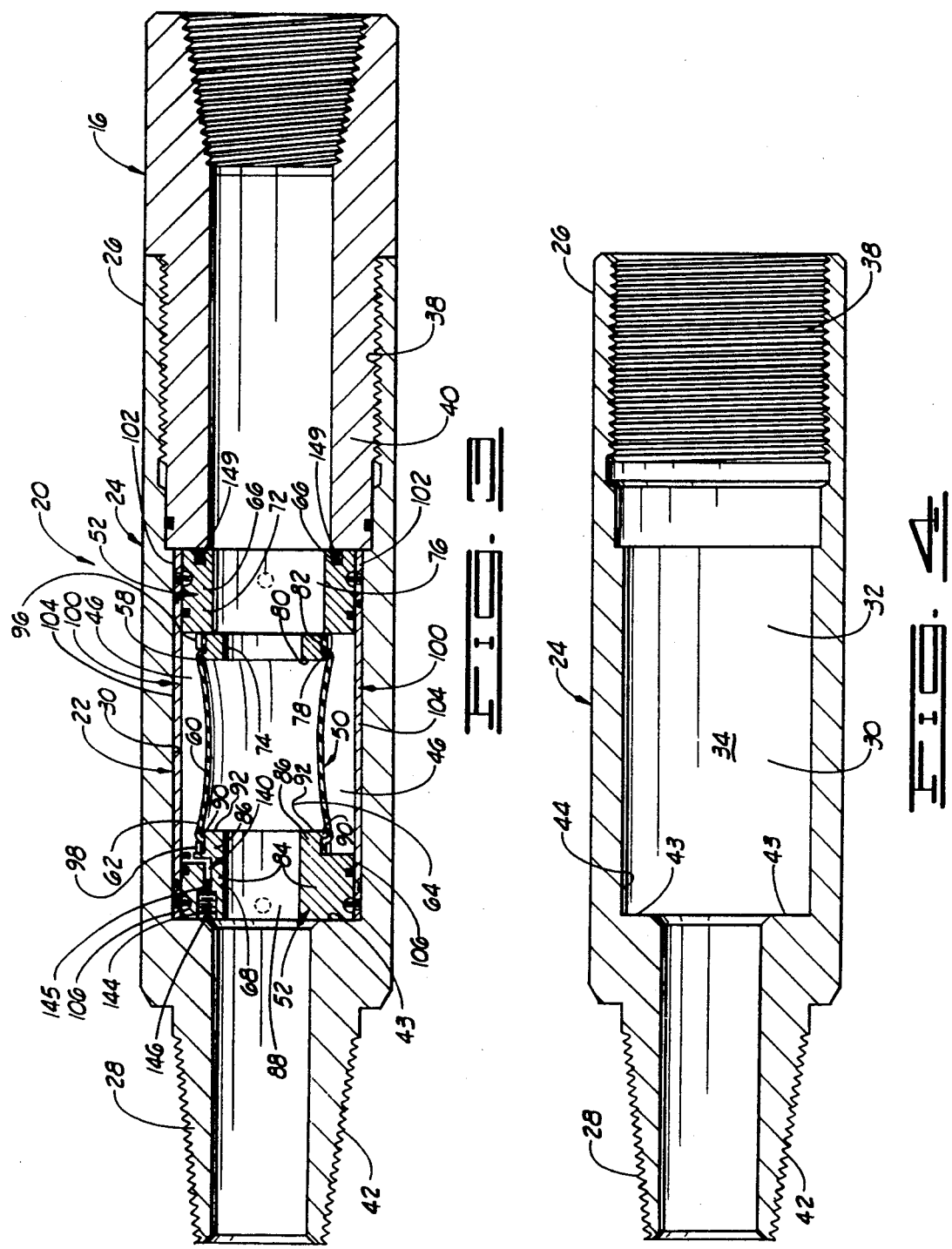

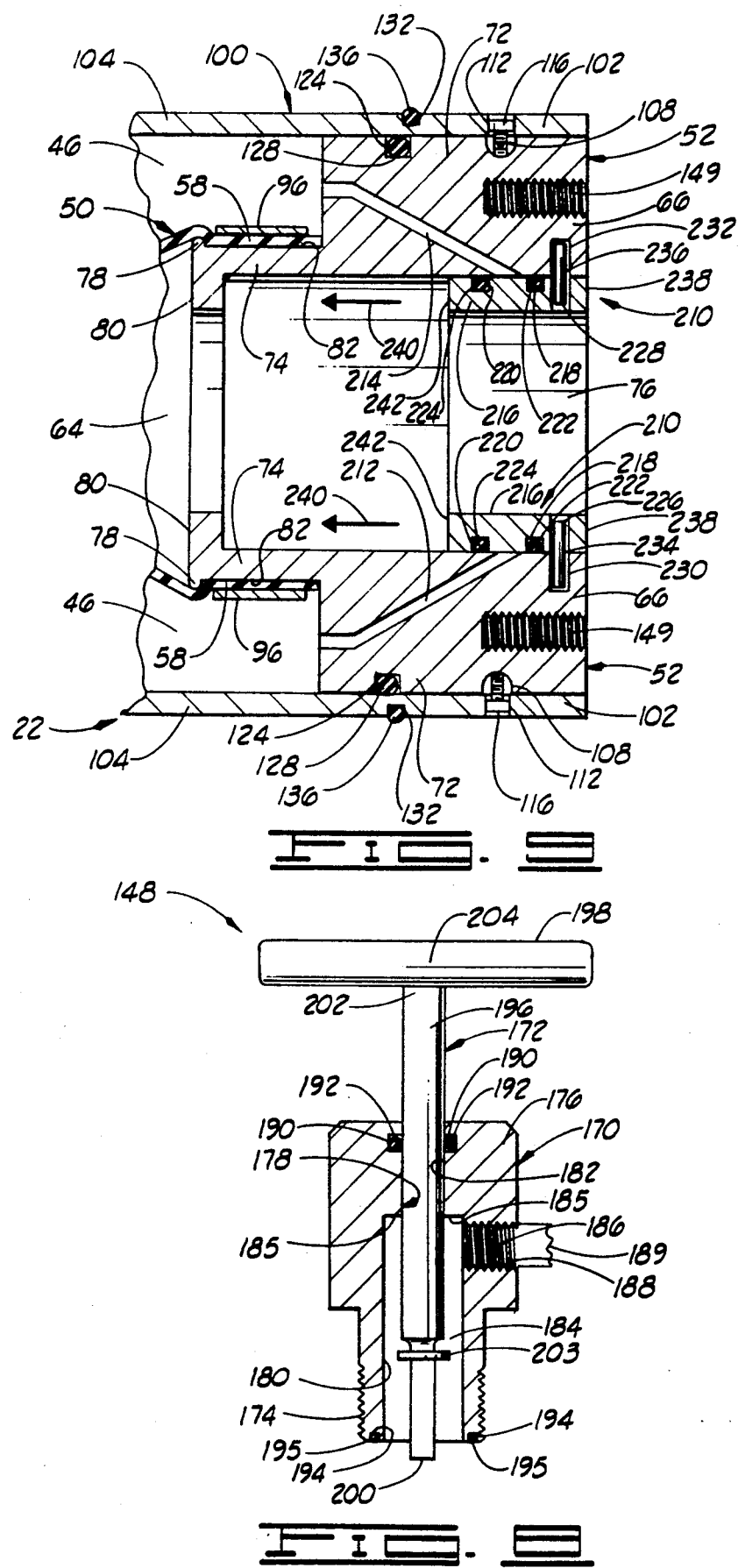

FLOW CONTROL VALVE

BACKGROUND OF THE INVENTION

1. Field of the Invention

The present invention relates generally to flow control valves, and more particularly, but not by way of limitation, to an improved flow control valve for preventing drainage of drilling fluids from a standpipe and rotary hose of a drilling rig when flow of the drilling fluid through a drill string is interrupted.

2. Discussion of the Prior Art

When drilling oil and gas wells using a rotary drilling rig, drilling fluids are circulated down the drill pipe through the bit and up the outside of the drill pipe. Each time a section of drill pipe is added to the drill string, it is necessary to halt or interrupt the flow of drilling fluids through the drill pipe. In such instances, problems are encountered because of the tendency of the drilling fluid to drain from the standpipe and rotary hose of the rig.

In an effort to resolve this problem, ball valves have been incorporated into the drill string. However, the normal useful life of one such ball valve is approximately 325 closures before the seat of the ball valve must be reworked, an expensive and time consuming procedure. For example, generally the ball valve in a drill string must be reworked or replaced after drilling to a depth of 9,000 feet. That is, 325 connections of drill pipe are required to form the drill string operating at a depth of 9,000 feet, resulting in the ball valve being actuated 325 times (its normal useful life) in order to interrupt the flow of drilling fluid through the drill string during the drilling of the well.

Because of the limited useful life of ball valves, and the expense incurred in reworking or replacing ball valves during the drilling operation, improved valve assemblies have been sought which can effectively prevent the drainage of drilling fluid from the standpipe and rotary hose when the flow of drilling fluid through the drill string is interrupted.

A pressurized check valve which overcomes many of the problems inherent with the use of ball valves in a drill string is disclosed in my U.S. Pat. No. 4,811,758, entitled "Pressurized Check Valve" and issued Mar. 14, 1989. The pressurized check valve disclosed in the '758 patent is a self-contained valve which is automatically actuated in response to fluid flow pressure of drilling fluids injected into the drill string. The pressurized check valve comprises a tubular body member having a valve chamber and a flow restricting assembly supported in the valve chamber. An access bore extends through a side wall of the tubular body member so as to openly communicate with the valve chamber.

The flow restricting assembly, which is secured within the valve chamber, is constructed to automatically open and close the valve chamber in response to the pressure of the fluids flowing through the tubular body member and the flow restricting assembly. The flow restricting assembly includes an elastomeric sleeve defining a bore therethrough which substantially corresponds in diameter to the diameter of a bore of the tubular body member downstream of the valve chamber when the elastomeric sleeve is in a non-compressed state.

A sleeve retention assembly is supported by the tubular body member for securing an upstream end of the elastomeric sleeve such that a medial portion and the downstream end of the elastomeric sleeve are disposed within the valve chamber. The medial portion of the elastomeric sleeve cooperates with the internal wall of the valve chamber to form an annular pressure cavity which openly communicates with the access bore extending through the side wall of the tubular body member. An annular piston supported by the downstream end of the elastomeric sleeve is slidably movable through the valve chamber.

In order to pressurize the annular pressure cavity so that the elastomeric sleeve will remain in a closed position until the flow of fluid therethrough is sufficient to overcome the pressure in the annular pressure cavity and cause the elastomeric sleeve to be displaced to an open position, a loading valve assembly is supported in the access bore so as to seal the access bore while permitting the annular pressure cavity to be charged to a predetermined pressure. The pressurized gas in the annular pressure cavity causes the elastomeric sleeve to restrict or collapse and thereby close the valve chamber to fluid flow until such time as the pressure of fluid injected through the tubular body member is sufficient to overcome the pressure in the annular pressure cavity.

While the pressurized check valve described above is self-contained and automatically actuated in response to flow pressure of drilling fluid injected into the drill string, new and improved flow control valves for incorporation into a drill string are constantly being sought. It is to such an improved flow control valve that the subject invention is directed.

SUMMARY OF THE INVENTION

According to the present invention, a flow control valve assembly is provided which, when connected to a rotatable drill string, prevents drainage of fluid from a standpipe and rotary hose of a drilling rig when fluid flow through the drill string is interrupted. Broadly, the flow control valve assembly comprises a tubular body member or housing having a fluid flow passage extending therethrough and a flow control valve supported within the fluid flow passage of the tubular body member. The flow control valve is provided with an annular pressure cavity so that when the annular pressure cavity is pressurized to a predetermined pressure, the flow control valve can be selectively opened and closed in response to pressure differential between the annular pressure cavity and the pressure of fluid in the fluid flow passage of the tubular body member.

The flow control valve is a self-contained pressurized unit which comprises a collapsible sleeve, a pair of spatially disposed sleeve support members, each of which is provided with a bore extensive therethrough, and a support cylinder. One end of the collapsible sleeve is connected to one of the sleeve support members and the other end of the collapsible sleeve is connected to the other sleeve support member.

One end of the support cylinder is connected to one of the sleeve support members and the opposed end of the support cylinder is connected to the other sleeve support member such that a fluid-tight seal is formed therebetween. Thus, the sleeve support members and the collapsible sleeve cooperate with the support cylinder to define the annular pressure cavity of the flow control valve.

The flow control valve is secured within the passage of a tubular body member in its pressurized condition. Thus, flow of fluid through the flow control valve is determined by the pressure differential of the pressurized gas in the annular pressurized cavity and the pressure of fluid flowing through the drill string.

In order to relieve pressure from the annular pressure cavity without removing the flow control valve from the drill string, the flow control valve also comprises a venting assembly. That is, should it become necessary to pass a tool, such as a fishing tool, through the flow control valve, the pressure in the annular pressure cavity can be effectively relieved with the venting assembly without removing the flow control valve from the drill string.

An object of the present invention is to provide an improved flow control valve for a rotary drilling rig which prevents drainage of drilling fluids from a standpipe and rotary hose of a drill string when the flow of fluid through the drill string is interrupted.

Another object of the present invention, while achieving the before-mentioned object, is to provide an improved flow control valve for a rotary drilling system which is automatically actuated in response to fluid flow through the drill string and which can be easily and economically replaced and serviced.

Another object of the present invention, while achieving the before-stated objects, is to provide an improved flow control valve for a rotary drilling rig which is economical to manufacture, durable in construction, has an extended useful life, and overcomes the disadvantages of the valves heretofore employed for such use.

Other objects, features and advantages of the present invention will become clear from the following detailed description when read in conjunction with the drawings and appended claims.

BRIEF DESCRIPTION OF THE DRAWINGS

FIG. 1 is a fragmental, pictorial representation of a portion of a rotating drill string of a rotary drilling rig having a flow control valve assembly of the present invention positioned within the drill string so as to be disposed between a lower kelly valve and an upper section of a drill pipe.

FIG. 2 is a cross-sectional view of the flow control valve assembly of the present invention wherein a collapsible sleeve of a flow control valve is in a collapsed condition for closing a valve chamber to fluid flow therethrough.

FIG. 3 is a cross-sectional view of the flow control valve assembly of the present invention wherein the collapsible sleeve of the flow control valve is in a non-collapsed condition for providing unrestricted flow of fluid therethrough.

FIG. 4 is a cross-sectional view of a tubular body member of the flow control valve assembly of the present invention.

FIG. 8 is an enlarged cross-sectional view of an implement employed to charge and seal an annular pressure cavity of the flow control valve assembly of the present invention.

FIG. 9 is an enlarged cross-sectional view of an upstream end portion of the flow control valve assembly of the present invention illustrating a venting assembly for relieving pressure in the annular pressure cavity without removing the flow control valve assembly from the drilling string.

DETAILED DESCRIPTION

Figure 5:
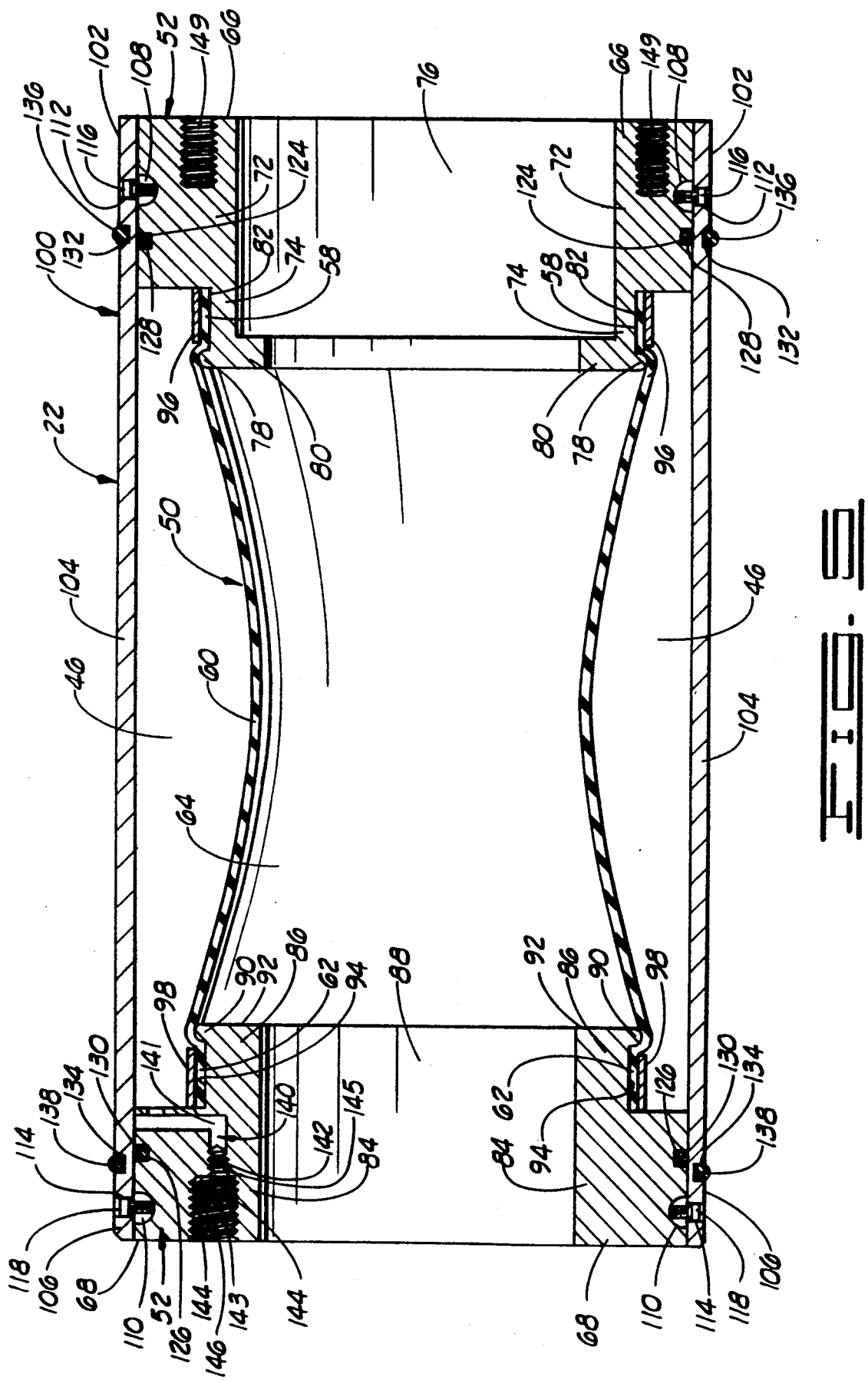
FIG. 5 is an enlarged cross-sectional view of the flow control valve of the present invention wherein the collapsible sleeve is in a non-collapsed condition.

Referring now to the drawings and more particularly to FIG. 1, a section of a rotatable drill string 10 of a drilling rig in which the drill string 10 is rotated by a rotary table (not shown) is illustrated. The drill string 10 includes an upper kelly valve 12, a kelly 14, a lower kelly valve 16 and an upper section of a drill pipe 18.

Included within the drill string 10, and positioned between the lower kelly valve 16 and the upper section of the drill pipe 18, is a pressurized flow control valve assembly 20 constructed in accordance with the present invention. All of the above components, with the exception of the flow control valve assembly 20, are standard components of rotary drilling rigs utilizing a rotary table for powering the drill string 10. Thus, no further comments as to such standard components are believed necessary to enable one skilled in the art to fully understand the subject invention described in detail hereinafter.

Referring now to FIGS. 2-4, the flow control valve assembly 20 comprises a flow control valve 22 and a tubular body member 24. The flow control valve 22, which is supported within the tubular body member 24, is automatically actuated by flow of fluid into the bore hole through the drill string 10 s that when the flow of the fluid is interrupted, as is required for the addition of a section of drill pipe to the drill string 10, the flow control valve 22 is automatically closed to prevent fluid flow therethrough. Thus, the pressurized flow control valve 22 prevents fluid from draining from a standpipe and rotary hose of the rig when the flow of fluid through the drill string 10 is interrupted.

The tubular body member 24 is provided with a first or upstream end portion 26 connectable to the lower kelly valve 16, and an opposed second or downstream end portion 28 connectable to an upper section of the drill pipe 18. The tubular body member 24 is further characterized as having a fluid flow passage 30 which extends between the first and second end portions 26, 28, respectively. A medial portion 32 of the fluid flow passage 30 defines a valve chamber 34 (FIG. 4) which supportingly receives the flow control valve 22.

The first end portion 26 of the tubular body member 24 is provided with internally disposed threads 38 for matingly engaging an externally threaded end portion 40 of the lower kelly valve 16; and the second end portion 28 of the tubular body member 24 is provided with externally disposed threads 42 for matingly engaging an internally threaded end portion (not shown) of the upper section of drill pipe 18.

The first end portion 26 of the tubular body member 24 is desirably provided with a interior tapered surface (approximately 15°) which produces a "dovetailing" effect when the first end portion 26 of the tubular body member 24 is connected to the threaded end portion 40 of the lower kelly valve 16. The "dovetailing" connection of the tubular body member 24 to the lower kelly valve 16 is important because the pressurized flow control valve assembly 20 is subjected to internal pressure and the weight load of the drill string 10; and because the tubular body member 24 of the pressurized flow control valve assembly 20 is subjected to torque as the pressurized flow control valve assembly 20 is rotated with the drill string 10. The "dovetailing" of the first end portion 26 of the tubular body member 24 also insures that a constant O.D. is maintained on the tubular body member 24 at the junction of the tubular body member 24 and the lower kelly valve 16, even during limited expansion resulting from the connection of such elements. In addition, the "dovetailing" provided by the tapered surface of the first end portion 26 of the tubular body member 24 permits the flow control valve 22 to be more easily removed from or positioned in the valve chamber 34 of the tubular body member 24 for replacement or repair.

The tubular body member 24 is also provided with an internally disposed annular shoulder 43 substantially adjacent a downstream end 44 of the valve chamber 34. Thus, in an assembled position one end of the flow control valve 22 abuttingly engages and is supported by the internally disposed annular shoulder 43 (FIGS. 2 and 3), and an opposed end of the flow control valve 22 abuttingly engages the threaded end portion 40 of the lower kelly valve 16. Thus, the flow control valve 22 is supported in a stable position in the valve chamber 34 of the tubular body member 24.

As will be discussed in more detail hereinafter, the flow control valve 22 is supported within the valve chamber 34 such that the flow control valve 22 automatically closes the valve chamber 34 to fluid flow therethrough (FIG. 2) when the flow of fluid through the drill string 10 is interrupted; and the flow control valve 22 automatically opens the valve chamber 34 to fluid flow (FIG. 3) in response to the pressure of the fluid flowing through the drill string 10. Thus, the flow control valve 22 is operated between the open and closed positions in response to pressure differential between pressure of gas in an annular pressure cavity 46 and the pressure of fluid in the drill string 10. That is, the flow control valve 22 is in a normally closed mode until such time as the pressure of the fluid injected into the formation via the drill string 10 is sufficient to overcome the pressure of gas in the annular pressure cavity 46.

Referring now to FIGS. 2, 3, 5 and 9, the flow control valve 22 comprises a collapsible sleeve 50 and a sleeve retention assembly 52. The collapsible sleeve 50 is characterized as having a first or upstream end portion 58, a medial portion 60 and an opposed second or downstream end portion 62. A bore 64 extends longitudinally through the collapsible sleeve 50 substantially as shown. The first and second end portions 58, 62 of the collapsible sleeve 50 are connected to the sleeve retention assembly 52 so that a fluid-tight seal is formed therebetween.

The collapsible sleeve 50 is fabricated of an elastomeric material, such as rubber or other material having similar characteristics, so that the collapsible sleeve 50 can be selectively compressed in response to the pressure differential between the gas pressure in the annular pressure cavity 46 and the pressure of fluid in the drill string 10. That is, when the pressure of the gas in the annular pressure cavity 46 exceeds the pressure of fluid in the drill string 10, the collapsible sleeve member 50 is compressed so as to prevent fluid flow therethrough (FIG. 2); whereas, when the pressure of fluid in the drill string 10 exceeds the pressure of the gas in the annular cavity 46, the collapsible sleeve 50 is disposed in a non-compressed condition so that the fluid flow through the collapsible sleeve 50 is substantially unrestricted (FIGS. 3 and 5).

The sleeve retention assembly 52 comprises a first sleeve support member 66 and a second sleeve support member 68. The first sleeve support member 66 is provided with a body portion 72 and a mounting hub 74. A fluid flow bore 76 extends longitudinally through the body portion 72 and the mounting hub 74 substantially as shown. The mounting hub 74 is provided with a retaining lip 78 on its distal end 80 so as to define a retaining surface 82 adapted to supportingly receive the first end portion 58 of the collapsible sleeve 50.

Similarly, the second sleeve support member 68 is provided with a body portion 84 and a mounting hub 86. A fluid flow bore 88 extends longitudinally through the body portion 84 and the mounting hub 86 substantially as shown. The mounting hub 86 is provided with a retaining lip 90 on its distal end 92 so as to define retaining surface 94 adapted to supportingly receive the opposed second end portion 62 of the collapsible sleeve 50.

The first and second sleeve support members 66, 68 are spatially disposed and positioned so that the mounting hubs 74, 86 thereof are disposed in a facing relationship and the bores 76, 88 are axially aligned. Thus, in an assembled position, the medial portion 60 of the collapsible sleeve 50 extends between the first and second sleeve support members 66, 68 substantially as shown.

Any suitable means can be employed for securing the first and opposed second end portions 58, 62 of the collapsible sleeve 50 to the retaining surfaces 82, 94 of the first and second sleeve support members 66, 68, respectively. That is, the first and opposed second end portions 58, 62 of the collapsible sleeve 50 can be secured on the retaining surfaces 82, 94 of the first and second sleeve support members 66, 68 by any suitable connector members, such as connector members 96, 98 so that a fluid-tight seal is formed between the first and second end portions 58, 62 of the collapsible sleeve 50 and the first and second sleeve support members 66, 68. For example, a compression and crimp ring, commonly employed in the hose industry for connecting the male and female threaded connectors to end portions of a hose, can be employed as the connector members 96, 98. Further, when employing such compression and crimp rings as the connector members 96, 98, the retaining lips 78, 90 formed on the distal ends 80, 92 of the first and second sleeve support members 66, 68 cooperate with the compression and crimp rings to securely connect the first and second end portions 58, 62 of the collapsible sleeve 50 to the first and second sleeve support members 66, 68, substantially as shown in FIG. 5.

To maintain the first and second sleeve support members 66, 68 in the desired spatial relationship within the valve chamber 34 of the tubular body 24, the flow control valve 22 further comprises a support cylinder 100. The support cylinder 100, which is provided with a length and O.D. substantially corresponding to the length and diameter of the valve chamber 34, is characterized as having a first end portion 102, a medial portion 104 and an opposed second end portion 106. The support cylinder 100 is positioned over the collapsible sleeve 50 and the first and second end portions 102, 106 of the support cylinder 100 are connected to the first and second sleeve support member 66, 68, respectively, so that a gas-tight seal is formed therebetween. Thus, the support cylinder 100 cooperates with the collapsible sleeve 50 and the first and second sleeve support members 66, 68 to define the annular pressure cavity 46.

As more clearly shown in FIG. 5, in order to secure the first and second sleeve support members 66, 68 to the first and second end portions 102, 106, respectively, of the support cylinder 100 so that a gas-tight seal is formed therebetween, the body portion 72 of the first sleeve support member 66 is provided with an externally disposed annular groove 108 and the body portion 84 of the second sleeve support member 68 is provided with an externally disposed annular groove 110. The support cylinder 100, which is disposed over the first and second support members 66, 68, is provided with a plurality of threaded apertures, such as apertures 112 and 114, in its first and opposed second end portions 102, 106. The apertures 112, 114 are aligned with the grooves 108, 110, respectively, of the first and second sleeve support members 66, 68 so that upon positioning screws 116, 118 into the threaded apertures 112, 114, the screws 116, 118 extend into the grooves 108, 110 and frictionally engage the first and second sleeve support members 66, 68 substantially as shown.

To provide a desired gas-tight seal between the first and second sleeve support members 66, 68 and the support cylinder 100, the body portions 72, 84 of the first and second sleeve support members 66, 68 are further provided with externally disposed annular grooves 124, 126. The annular grooves 124, 126, which are spatially disposed from the annular grooves 108, 110, are sized and adapted to receive a suitable sealing member, such as O-rings 128, 130. Thus, in an assembled position the O-rings 128, 130 frictionally engage the the support cylinder 100, and provide a gas-tight seal therebetween.

In order to provide a fluid-tight seal between the support cylinder 100 and the portion of the tubular body member 24 defining the valve chamber 34, the first end portion 102 of the support cylinder 100 is provided with an externally disposed annular groove 132 and the opposed second end portion 106 is provided with an externally disposed annular groove 134. The annular grooves 132, 134 are sized and adapted to receive suitable sealing members, such as O-rings 136, 138. Thus, in an assembled position the O-rings 136, 138 frictionally engage the tubular body member 34 so that a fluid-tight seal is formed between the support cylinder 100 and the tubular body member 24.

As more clearly shown in FIG. 5, the body portion 84 of the second sleeve support member 68 is provided with an access bore 140 openly communicating with the annular pressure cavity 46. A first end portion 141 of the access bore 140 is provided with internally disposed threads 142, and a second end portion 143 of the access bore 140 is provided with internally disposed threads 144. The I.D. of the second end portion 143 of the access bore 140 is greater than the I.D. of the first end portion 141 of the access bore 140 so that an internally disposed shoulder 144 is formed at the junction of the first and second end portions 141, 143 of the access bore 140.

In order to close off the annular pressure cavity 46 and form a gas-tight seal, the flow control valve 20 further comprises a first plug member 145 and a second plug member 146. The first plug member 145 is positionable through the second end portion 143 of the access bore 140 and adapted to matingly engage the internally disposed threads 142 in the first end portion 141; whereas the second plug member 146 is adapted to matingly engage the internally disposed threads 144 in the second end portion 143 of the access bore 140, substantially as shown. Thus, the first and second plug members 145, 146 cooperate to close off the access bore 140 and thereby insure that a gas-tight seal for the access bore 140 is formed so that the desired gas pressure can be maintained in the annular pressure cavity 46 of the flow control valve assembly 20. That is, the first and second plug members 145, 146 effectively seal the access bore 140 and, upon removal therefrom, provide open communication to the annular pressure cavity 46 via the access bore 140. Thus, the annular pressure cavity 46 can be charged with a predetermined amount of a pressurized gas capable of collapsing the collapsible sleeve 50 of the flow control valve assembly 20 to close off fluid flow through the valve chamber 34 thereof when pressure in the drill string drops below a predetermined pressure.

The positioning and removal of the first and second plug members 145, 146, so as to seal the annular pressure cavity 46, or to permit charging of the annular pressure cavity 46 with an effective amount of pressurized gas, can be accomplished employing a charging apparatus 148 illustrated in FIG. 8. The pressurizing and sealing of the annular pressure cavity 46 with the charging apparatus 148 will be described more fully hereinafter.

The flow control valve 22, as hereinbefore described is a self-contained pressurized unit or cartridge which can be readily positioned within and removed from the valve chamber 34 of the tubular body member 22. That is, the flow control valve 22 can be removed from the valve chamber 34 by disconnecting the tubular body member 24 from the lower kelly valve 16 and thereafter withdrawing the flow control valve 22.

To enhance removal of the flow control valve 22 from the valve chamber 34, the first sleeve support member 66 is provided with threaded bores 149 which extend a distance into the body portion 72 of the first sleeve support member 66 substantially as shown. The threaded bores 149 are adapted to receive threaded stub members (not shown) of a valve puller (also not shown) so that the flow control valve 22 can be more easily withdrawn from the valve chamber 34 of the tubular body member 24 for replacement and/or repair.

Figure 6:
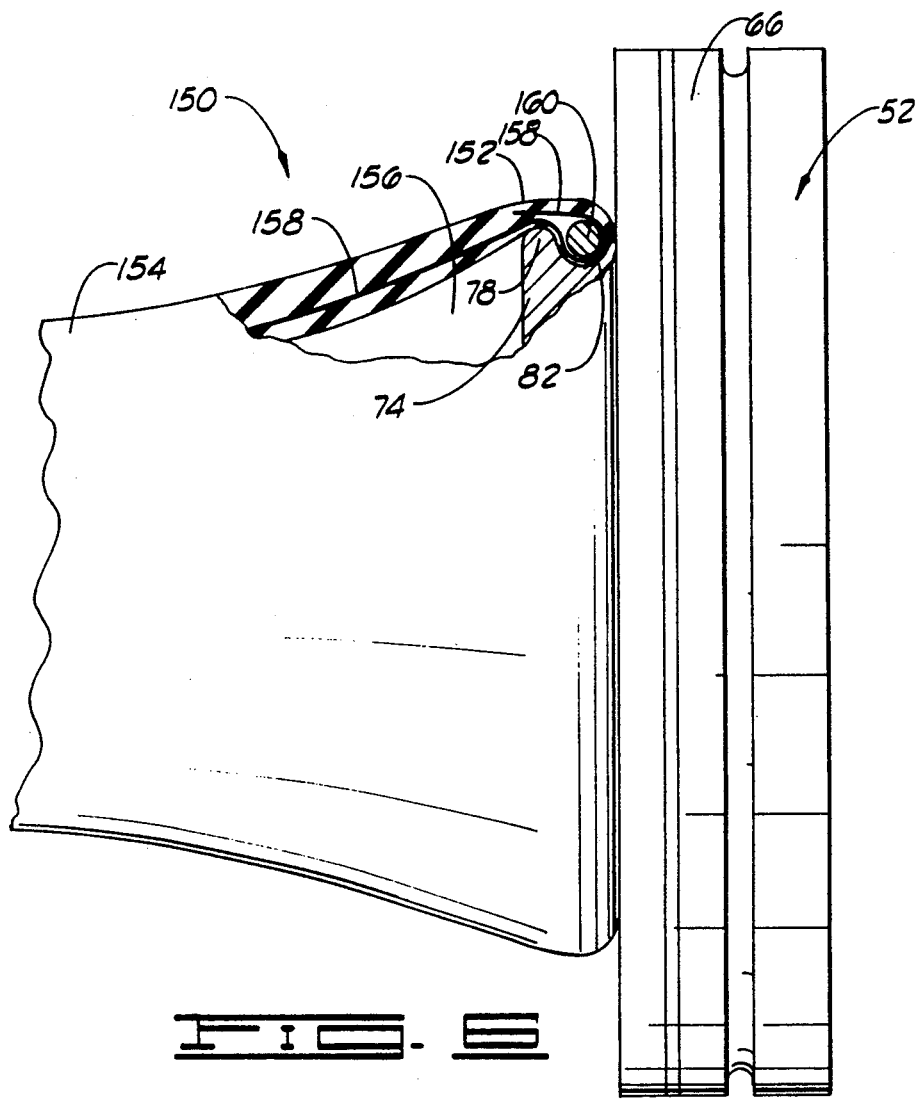
FIG. 6 is an enlarged fragmental, partially cross-sectional view of a second embodiment of the collapsible sleeve of the flow control valve depicting the attachment of one end of the collapsible sleeve to a support member.

Referring now to FIG. 6, a second embodiment of a collapsible sleeve 150 of the flow control valve 22 is illustrated. The collapsible sleeve 150 is characterized as having a first or upstream end portion 152, a medial portion 154 and an opposed second or downstream end portion (not shown). The downstream end portion of the collapsible sleeve 150 is identical in construction to the upstream end portion 152; and the connection of the downstream end portion of the collapsible sleeve 150 to the second sleeve support member 68 is identical to the connection of the upstream end portion 152 of the collapsible sleeve 150 to the first sleeve support member 66. Thus, only the first end portion 152 of the collapsible sleeve 150 and its connection to the first sleeve support member 66 will be described hereinafter.

Figure 7:
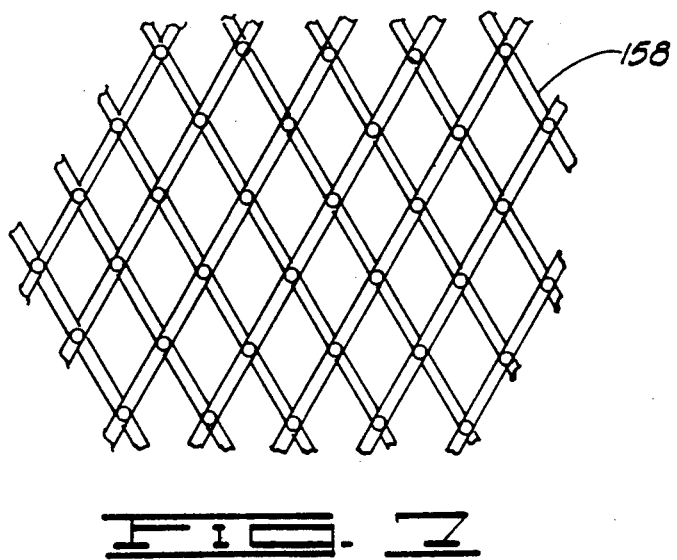
FIG. 7 is a pictorial representation of a reinforcing cord of the collapsible sleeve of FIG. 6.

The collapsible sleeve member 150, which is provided with a longitudinally extending bore 156, is fabricated of an elastomeric material (such as rubber or other material having similar characteristics) and reinforced by a structural cord, such as cord 158 (see also FIG. 7). Since reinforcement of elastomeric materials using cords is well known in the tire fabrication art, the particular characteristics or method of forming the collapsible sleeve 150 from an elastomeric material and a structural cord will not be described in detail herein.

In addition to the cord material 158 being impregnated within the elastomeric material, the first and second end portions of the collapsible sleeve 150, such as the first end portion 152, are provided with a bead 160 substantially as shown. Thus, when securing the first and second end portions of the collapsible sleeve 150 to the first and second sleeve support members, such as the first end portion 152 to the first sleeve support member 66, the bead 160 is supported on the retaining surface 82 of the mounting hub 74 and frictionally engages the retaining lip 78 of the first sleeve support member 66. That is, the bead 160 abuttingly engages the retaining lip 78 and secures the first end portion 152 of the collapsible sleeve 150 to the first sleeve support member 66. Thus, the collapsible sleeve 150 functions in an identical manner to the collapsible sleeve 50 heretobefore described.

Referring now to FIG. 8, the charging apparatus 148 for pressurizing and sealing the annular pressure cavity 46 of the flow control valve assembly 20 is illustrated. The charging apparatus 148 comprises a body member 170 and a plunger member 172 reciprocally movable therethrough. The body member 170 is characterized as having a threaded first end portion 174, an opposed second end portion 176 and a plunger-receiving bore 178 extending longitudinally through the body member 170.

The plunger-receiving bore 178, which is adapted to slidably receive the plunger member 172 so that the plunger member 172 can be reciprocally moved therethrough, is provided with a first end portion 180 and a second end portion 182. The first end portion 180 has an I.D. greater than the I.D. of the second end portion 182 so that an annulus 184 is formed about the portion of the plunger member 172 extending through the first end portion 180 of the plunger-receiving bore 178. Thus, a shoulder 185 is formed at the junction of the first and second end portions 180, 182 of the plunger-receiving bore 178, substantially as shown.

The body member 170 of the charging apparatus 148 is further provided with a gas inlet bore 186 which openly communicates with the first end portion 180 of the plunger-receiving bore 178 and thus the annulus 184. The gas inlet bore 186 is illustrated as having internally disposed threads 188 so that a loading valve 189 can be connected thereto for charging the annular pressure cavity 46 of the flow control valve assembly 20 to a desired pressure.

Loading valves which can be employed as the loading valve 189 to pressurize the annular pressure cavity 46 of the flow control valve assembly 20 of the present invention are well known in the art. For example, a commercially available loading valve which can be employed as the loading valve 189 pressurize the annular pressure cavity 46 of the flow control valve assembly 20 is a Schrader loading valve no. 3642 manufactured by Schrader Valve Company of Memphis, Tenn.

In order to provide a gas-tight seal between the body member 170 and the plunger member 172, while permitting the plunger member 172 to be reciprocally moved and rotated within the plunger-receiving bore 178, the body member 170 is further provided with an annular recess 190 in the second end portion 176, substantially as shown. The annular recess 190 is adapted to receive a sealing member, such as an O-ring 192, so that a gas-tight seal is formed between the plunger member 172 and the second end portion 176 of the body member 170, while at the same time permitting the plunger member 172 to be reciprocated and rotated in the plunger-receiving bore 178.

As previously indicated, the threaded first end portion 174 of the body member 170 is matingly connected to the second end portion 143 of the access bore 140 during pressurization of the annular pressure cavity 46 of the flow control valve assembly 20, as well as during the sealing of the first end portion 141 of the access bore 140 with the first plug member 145. In order to provide a gas-tight seal between the charging apparatus 148 and the second sleeve support member 68 during either pressurizing or sealing of the annular pressure cavity 46 with the first plug member 145, the first end portion 174 of the body member 170 is provided with an annular recess 194 adapted to receive a sealing member, such as O-ring 195. Thus, when the first end portion 174 of the body member 170 is threadably disposed in the second end portion 143 of the access bore 140, the first end portion 174 of the body member 170 abuttingly engages the shoulder 144 formed between the first and second end portions 141, 143 of the access bore 140, resulting in compression of the O-ring 195. Compression of the O-ring 195, due to the connection of the charging apparatus 170 to the second sleeve support member 68, produces a gas-tight seal between the second sleeve support member 68 and the charging apparatus 170.

The plunger member 172, which is reciprocally and rotatably movable within the plunger-receiving bore 178 of body member 170, is a substantially T-shaped member having a shank 196 and a substantially normally disposed handle member 198. The shank 196, an elongated member having a first end 200 and an opposed second end 202, is provided with a length greater than the length of the body member 170 so that the shank 196 can be selectively reciprocated through the plunger-receiving bore 178 of the body member 170.

A stop member 203 is secured to the shank 196 a selected distance from the first end 200 thereof, substantially as shown. The stop member 203 has a diameter greater than the diameter of the second end portion 182 of the plunger-receiving bore 178. Thus, the stop member 203 abuttingly engages the shoulder 185 when the plunger member 172 is retracted. Further, the stop member 203 prevents the plunger member 172 from being inadvertently expelled from the body member 170 during pressurization of the annular pressure cavity 46.

The first end 200 of the shank 196 has a hexagonal or other suitable configuration corresponding to the configuration of a female recess formed in a head portion of the first plug member 145, and the second end 202 of the shank 196 is connected to a medial portion 204 of the handle member 198. By providing the first end 200 of the shank 196 with a configuration corresponding to the configuration of a female recess formed in the head portion of the first plug member 145, the first plug member 145 can be stabilized on the first end portion 200 of the shank 196 during passage through the second end portion 143 of the access bore 140. Further, the configuration of the first end portion 200 of the shank 196 permits one to rotate the first plug member 145 via rotation of the handle member 198 of the plunger member 172 so that the first plug member 145 matingly engages the internally disposed threads 142 in the first end portion 141 of the access bore 140 and provides a gas-tight seal therebetween.

Once the first plug member 145 has been secured within the first end portion 141 of the access bore 140, the plunger member 172 is withdrawn from contact with the first plug member 145, and the body member 170 of the charging apparatus 148 is disconnected from mating engagement with the second end portion 143 of the access bore 140. Thereafter, the second plug member 146 is threadably connected to the internally disposed threads 144 in the second end portion 143 of the access bore 140. Thus, the first and second plug members 145, 146 cooperate to form a double seal for the access bore 140 and thereby insure that a gas-tight seal is formed for the access bore 140 and the annular pressure cavity 46 of the flow control valve assembly 20.

Referring now to FIG. 9, the flow control valve assembly 20 of the present invention is illustrated as further comprising a venting assembly 210 for relieving pressure in the annular pressure cavity 46 without removing the flow control valve assembly 20 from the drill string. That is, when it is desirable to pass a tool, such as a fishing tool, through the drill string, and thus the flow control valve 22 of the flow control valve assembly 20, one must first vent the pressure from the annular pressure cavity 46. Thus, when the gas pressure is vented from the annular pressure cavity 46, the collapsible sleeve 50 of the flow control valve 22 returns to a noncompressed condition, substantially as shown in FIG. 5, so that the tool can be passed through the flow control valve 22 without damage to the collapsible sleeve member 50.

When incorporating the venting assembly 210 into the flow control valve assembly 20, the first sleeve support member 66 is provided with a plurality of gas-venting passageways, such as gas-venting passageways 212, 214, which extend between the annular pressure cavity 46 and the fluid flow bore 76 extending through the body 72 of the first sleeve support member so that fluid communication is established therebetween. The venting assembly 210, which in normal operating conditions is connected to the body portion 72 of the first sleeve support member 66, cooperates with the body portion 72 of the first sleeve support member 66 to close off the gas-venting passageways 212, 214 and provide a gas-tight seal for the annular pressure cavity 46. The gas-tight seal formed by the connection of the venting assembly 210 to the body portion 72 of the first sleeve support member 66 is maintained until the venting assembly 210 is forceably moved in a downstream direction and into engaging contact with the distal end 80 of the mounting hub 74 of the first sleeve support member 66. That is, movement of the venting assembly 210 in the downstream direction results in the gas-venting passageways 212, 214 becoming substantially unrestricted so that the pressure of the gas in the annular pressure cavity 46 is vented through the gas-venting passageways 212, 214. As previously stated, when the gas pressure is vented from the annular pressure cavity 46, the collapsible sleeve member 50 returns to its non-compressed condition.

The venting assembly 210 comprises a ring member 216 having externally disposed annular grooves 218, 220, each of which is adapted to receive a sealing member, such as O-rings 222, 224, respectively. The ring member 216 is further provided with a pair of oppositely disposed bores 226, 228 extending therethrough, substantially as shown. A pair of bores 230, 232 extend a distance into the body portion 72 of the first sleeve support member 66; and the bores 230, 232 are alignable with the bores 226, 228, respectively, extending through the ring member 216.

In order to secure the ring member 216 in a stable position to effectively close off the gas-venting passageways 212, 214 and provide a gas-tight seal, a dial pin 234 is disposed within the aligned bores 226, 230 extending through the ring member 216 and into the body portion 72 of the first sleeve support member 66, and a dial pin 236 is disposed within the aligned bores 228, 232 extending through the ring member 216 and into the body portion 72 of the first sleeve support member 66 substantially as shown. Thus, the dial pins 234, 236 secure the ring member 216 in a stable passageway-closing position; and the dial pins 234, 236 cooperate with the O-rings 222, 224 to form a gas-tight seal between the ring member 216 of the venting assembly 210 and the gas-venting passageways 212, 214 in the first sleeve support member 66 of the flow control valve 22.

When it is necessary to vent the annular pressure cavity 46, a tool is inserted into the drill string to abuttingly engage an upstream end 238 of the ring member 216. A downward force is then applied to the tool, and thus to the ring member 216 whereupon the dial pins 234, 236 are sheared and the ring member 216 is moved in the direction of the arrows 240 until a downstream end 242 of the ring member 216 abuttingly engages the distal end 80 of the mounting hub 74 of the first sleeve support member 66. As can be appreciated, when the ring member 216 abuttingly engages the distal end 80 of the mounting hub 74, the gas-venting passageways 212, 214 are unrestricted so that gas in the annular pressure cavity 46 is vented, resulting in the collapsible sleeve 50 returning to its non-collapsed condition.

It is believed that the operation of the flow control valve 22 of the present invention will be apparent so only a brief description thereof will be necessary. In assembling the flow control valve 22, the collapsible sleeve (such as the collapsible sleeve 50) is connected to the first and second sleeve support members 66, 68 so that a fluid-tight seal is formed therebetween. O-rings 128, 130 are positioned within the annular grooves 124, 126 formed in the first and second sleeve support members 66, 68 and the support cylinder 100 is positioned over the first and second sleeve support members 66, 68, and the collapsible sleeve 50. The support cylinder 100 is then secured to the first and second sleeve support members 66, 68 via screws 116, 118.

When the venting assembly 210 is incorporated into the flow control valve 22, O-rings 222, 224 are positioned in the annular grooves 218, 220 of the ring member 216 and ring member 216 of the venting assembly 210 is positioned within the bore 76 of the first sleeve support member 66 such that the bores 226, 228 of the ring member 216 are aligned with the bores 230, 232 extending into the body portion 72 of the first sleeve support member 66. Thereafter, the dial pins 234, 236 are positioned within the aligned bores so that the ring member 216 is secured in a stable position to the first sleeve support member 66 in a covering position and the passageways 212, 214 are disposed between the O-rings 222, 224 on the ring member 216.

Prior to positioning the flow control valve 22 within the valve chamber 34 of the tubular body member 24, the annular pressure cavity 46 is pressurized with an effective amount of a gas, such as air supplied by the rig (i.e. rig air), or a bottle gas such as nitrogen. The amount of gas charged to the annular pressure cavity 46 can vary depending upon the properties of the elastomeric sleeve 50, but will generally be in an amount effective to provide about 120 pounds of precharged pressure to the annular pressure cavity 46.

To charge the annular pressure cavity 46 of the flow control valve 22, the first plug member 145 is positioned on the first end 200 of the shank 196 of the charging apparatus 148. The charging apparatus 148, which is equipped with a loading valve connected to the gas inlet bore 186 of the body 170, is then threadably connected to the second end portion 143 of the access bore 140 so that a gas-tight seal is formed therebetween. A source of pressurized gas, which is connected to the loading valve 189, pressurizes the annular pressure cavity 46 to a predetermined pressure. When the annular pressure cavity 46 has been charged to the desired pressure, the first plug member is brought into engaging contact with the first end portion 141 of the access bore 140 and secured therein by rotation of the plunger member 172 so that a gas-tight seal is formed for the first end portion 141 of the access bore 140. The venting assembly 210 is then disconnected from the first sleeve support member 66 and the second plug member 146 is threadably secured in the second end portion 143 of the access bore 140. Thus, the first and second plug members 145, 146 cooperate to form a gas-tight seal for the access bore 140.

It should be noted that during the charging of the annular pressure cavity 46, the medial portion 60 of the collapsible sleeve 50 will be caused to collapse and/or compress so as to effectively close the valve chamber 34.

The flow control valve 22, once assembled and charged, is then positioned within the valve chamber 34 in the tubular body member 24 and the tubular body member 24 is then connected to the lower kelly valve 16 and the upper section of the drill pipe 18 of the drilling string 10 in a conventional manner. The design of the tubular body member 24, in cooperation with the connection between the tubular body member 24 and the lower kelly valve 16 secures the flow control valve 22 in a stable position within the valve chamber 34 of the tubular body member 24.

Once the flow control valve assembly 20 has been assembled, charged and positioned within the drill string 10 and the flow of drilling fluid, such as drilling mud, is commenced through the drill string 10, the pressure of the drilling fluid contacting the compressed medial portion 60 of the elastomeric sleeve 50 will override the pressure in the annular pressure cavity 46 and open the valve chamber 34 by forcing the collapsible sleeve 50 towards its non-compressed condition until such time a the fluid flowing therethrough has sufficient pressure to fully extend the medial portion of the collapsible sleeve 50 and provide the bore therethrough with unrestricted flow. Because of the unique construction of the check valve assembly 20 of the present invention, the precharged, pressurized gas in the annular pressure cavity 46 can be compressed or permitted to expand dependent solely upon the pressure of the fluid injected through the valve chamber 34 and thus the collapsible sleeve 50 of the flow control valve assembly 20.

The flow control valve assembly 20 of the present invention is not only durable in construction and substantially maintenance free, but is also economical to manufacture. Further, while the access bore 140 for establishing fluid communication with the annular pressure cavity 46 has been illustrated as extending through the second sleeve support member 68, it is to be understood that the access bore 140 could be provided through the support cylinder 100 without departing from the scope of the present invention. Thus, it is clear that the present invention is well adapted to carry out the objects and obtain the ends and advantages mentioned herein as well as those inherent in the invention. While the presently preferred embodiment of the invention has been described for the purposes of this disclosure, numerous changes may be made which will readily suggest themselves to those skilled in the art and which are accomplished within the spirit of the invention disclosed and as defined in the appended claims.

What is claimed is:

1. A pressurized flow control valve assembly connectable to a rotatable drill string and adapted to prevent drainage of fluid from a stand pipe and rotary hose of a drilling rig when fluid flow through the drill string is interrupted, the pressurized flow control valve assembly comprising:

a tubular body member having a first end portion, and opposed second end portion and a fluid flow passage extensive therethrough;

flow control valve means supported within the fluid flow passage of the tubular body member for controlling fluid flow therethrough, the flow control valve means having an annular pressure cavity such that the flow control valve means selectively opens and closes the fluid flow passage in response to pressure differential between the annular pressure cavity and the fluid flow passage, the flow control valve means comprising:

a collapsible sleeve having a first end portion and an opposed second end portion;

a first sleeve support member adapted to support the first end portion of the collapsible sleeve, the first sleeve support member having a bore extensive therethrough;

a second sleeve support member spatially disposed from the first sleeve support member and adapted to support the second end portion of the collapsible sleeve, the second sleeve support member having a bore extensive therethrough, each of the first and second sleeve support members comprising:

a body portion; and a mounting hub extending from the body portion, the mounting hub having a retaining lip on its distal end so as to define a retaining surface, in an assembled position the mounting hubs of the first and second sleeve support members being disposed in a facing relationship and each of the retaining surfaces of the mounting hubs supportingly engaging an adjacent end portion of the collapsible sleeve;

sleeve retaining means for securing the first and second end portions of the collapsible sleeve to the mounting hubs of the first and second sleeve support members, respectively, such that a fluid-tight seal is formed therebetween;

a support cylinder having a first end portion, a medial portion and an opposed second end portion, the first end portion connected to the body portion of the first sleeve support member and the second end portion connected to the body portion of the second sleeve support member, the medial portion of the support cylinder cooperating with the body portions of the first and second sleeve support members and the collapsible sleeve to define the annular pressure cavity; and means for sealing the annular pressure cavity.

2. The pressurized flow control valve assembly of claim 1 wherein the flow control valve means further comprises:

connector means for connecting the first and second sleeve support members in a substantially stationary position within the fluid flow passage such that the collapsible sleeve and the first and second sleeve support members cooperate to define the annular pressure cavity substantially around the collapsible sleeve.

3. The pressurized flow control valve assembly of claim 1 wherein one of the first and second sleeve support members is provided with an access bore extending therethrough, so as to provide fluid communication with the annular pressure cavity, the access bore having a first end portion and a second end portion, the second end portion having a diameter greater than the diameter of the first end portion so that a shoulder is formed at the junction of the first and second end portions of the access bore, and wherein the means for sealing the annular pressure cavity comprises:

a first plug member positionable within the first end portion of the access bore so as to form a gas-tight seal therebetween ; and a second plug member disposable within the second end portion of the access bore so as to provide a gas-tight seal therebetween.

4. The pressurized flow control valve assembly of claim 1 wherein one of the first and second sleeve support members is provided with an access bore extending therethrough so as to openly communicate with the annular pressure cavity, the access bore having a first end portion and a second end portion, the second end portion having a diameter greater than the diameter of the first end portion so that a shoulder is formed at the junction of the first and second end portions of the access bore, and wherein the pressurized flow control valve assembly further comprises:

charging means connectable to the second end portion of the access bore so that gas can be charged into the annular pressure cavity to pressure same to a desired pressure, the charging apparatus adapted to support the means for sealing the annular pressure cavity such that the annular pressure cavity can be sealed prior to disconnection of the charging means to prevent loss of pressure from the annular pressure cavity.

5. The pressurized flow control valve assembly of claim 1 wherein the flow control valve means further comprises:

first sealing means supported by the body portion of the first and second support member for providing a fluid-tight seal between the body portions of the first and second support members and the support cylinder.

6. The pressurized flow control valve assembly of claim 5 wherein the flow control valve means further comprises:

second sealing means supported by the support cylinder for providing a fluid-tight seal between the support cylinder and the tubular body member.

7. The pressurized flow control valve assembly of claim 6 wherein the collapsible sleeve is fabricated of a cord-reinforced elastomeric material.

8. The pressurized flow control valve assembly of claim 7 wherein one of the first and second sleeve support members is provided with an access bore extending therethrough and openly communicating with the annular pressure cavity, the access bore having a first end portion and a second end portion, the second end portion having a diameter greater than the diameter of the first end portion so that a shoulder is formed at the junction of the first and second end portions of the access bore, and wherein the means for sealing the annular pressure cavity comprises:

plug means positionable within the first end portion of the access bore for sealing the access bore to gas flow therethrough.

9. The pressurized flow control valve assembly of claim 5 wherein the collapsible sleeve is fabricated of a cord-reinforced elastomeric material.

10. A pressurized flow control valve assembly connectable to a rotatable drill string and adapted to prevent drainage of fluid from a standpipe and rotary hose of a drilling rig when fluid flow through the drill string in interrupted, the pressurized flow control valve assembly comprising:

a tubular body member having a first end portion, an opposed second end portion and a fluid flow passage extensive therethrough, the tubular body member defining a valve chamber having an internally disposed shoulder adjacent a downstream end thereof, the first end portion of the tubular body member having internally disposed threads adapted to threadably receive a threaded male portion of a lower kelly valve of the drill string;

flow control valve means supported within the valve chamber of the tubular body member for controlling fluid flow through the fluid flow passage of the tubular body member, the flow control valve means having an annular pressure cavity such that the flow control valve means selectively opens and closes in response to pressure differential between the annular pressure cavity and the fluid flow passage, the flow control valve means comprising:

a collapsible sleeve having a first end portion and an opposed second end portion;

a first sleeve support member adapted to support the first end portion of the collapsible sleeve, the first sleeve support member having a bore extending therethrough, the first sleeve support member adapted to abuttingly engage the internally disposed shoulder in the tubular body member;

a second sleeve support member spatially disposed from the first sleeve support member and adapted to support the second end portion of the collapsible sleeve such that the collapsible sleeve extends between the first and second sleeve support members, the second sleeve support member having a bore extending therethrough, the second sleeve support member adapted to abuttingly engage the threaded male portion of the lower kelly valve;

sleeve retaining means for securing the first and second end portions of the collapsible sleeve to the first and second sleeve support members, respectively, such that a fluid-tight seal is formed therebetween;

a support cylinder having a first end portion, a medial portion and an opposed second end portion, the first end portion connected to the first sleeve support member and the second end portion connected to the second sleeve support member such that the first and second sleeve support members, the collapsible sleeve extending therebetween and the support cylinder are secured in a stable position within the valve chamber of the tubular body member, the medial portion of the support cylinder cooperating with the first and second sleeve support members and the collapsible sleeve to define the annular pressure cavity; and means for sealing the annular pressure cavity.

11. The pressurized flow control valve assembly of claim 10 wherein the collapsible sleeve is fabricated of a reinforced elastomeric material.

12. The pressurized flow control valve assembly of claim 10 wherein the second sleeve support member is provided with an access bore openly communicating with the annular pressure cavity, the access bore adapted to receive the means for sealing the annular pressure cavity so that the annular pressure cavity can be maintained at a desired pressure resulting from pressurization of the annular pressure cavity prior to connection of the means for sealing same, and wherein the first sleeve support member is provided with a plurality of gas-venting passageways extending therethrough for establishing fluid communication between the annular pressure cavity and a fluid flow bore extending longitudinally through the first sleeve support member, and wherein the pressurized flow control valve assembly further comprises:

means for venting pressure from the annular pressure cavity of the flow control valve means, the means for venting pressure being connected to the first sleeve support member and selectively movable between a first position and a second position, in the first position the means for venting pressure from the annular pressure cavity being disposed in a covering position over the gas-venting passageways so that a gas-tight seal is formed therebetween and the gas-venting passageways are effectively closed so that gas pressure is maintained within the annular pressure cavity, in the second position the means for venting pressure from the annular pressure cavity being disposed in a noncovering position relative to the gas-venting passageways so that the gas pressure in the annular pressure cavity can be vented therethrough.

13. A flow control valve for use with a tubular body member having a fluid flow passageway extensive therethrough, the tubular body member connectable to a rotatable drill string, the flow control valve adapted to prevent drainage of a fluid from a stand pipe and rotary hose of a drilling rig via the tubular body member when fluid flow the drill string is interrupted, the flow control valve comprising:

flow control means supported within the fluid flow passage of the tubular body member for controlling fluid flow therethrough, the flow control means having an annular pressure cavity such that the flow control means is selectively opened and closed in response to pressure differential between the annular pressure cavity and the pressure of fluid flowing through the flow control valve means, the flow control means comprising:

a collapsible sleeve having a first end portion and an opposed second end portion;

a first sleeve support member adapted to support the first end portion of the collapsible sleeve, the first sleeve support member having a bore extensive therethrough;

a second sleeve support member spatially disposed from the first sleeve support member and adapted to support the second end portion of the collapsible sleeve, the second sleeve support member having a bore extensive therethrough, each of the first and second sleeve support members comprising:

a body portion; and a mounting hub extending from the body portion such that the bore of each of the first and second sleeve support members extends through the body portion and the mounting hub, the mounting hub defining a retaining surface for supportingly receiving an adjacent end portion of the collapsible sleeve, the mounting hubs of the first and second sleeve support members being disposed so that he retaining surface defined by the mounting hubs are in a facing relationship, the mounting hub of one of the first or second sleeve support members having an access bore openly communicating with the annular pressure cavity, the access bore having a first end portion and a second end portion, the second end portion having a diameter greater than the diameter of the first end portion so that a shoulder is formed at the junction of the first and second end portions of the access bore;

a support cylinder having a first end portion, a medial portion and an opposed second end portion, the first end portion connected to the first sleeve support member and the second end portion connected tot he second sleeve support member such that the medial portion of the support cylinder is disposed in a covering position over the collapsible sleeve and cooperates with the collapsible sleeve to define the annular pressure cavity therebetween;

connector means for connecting the first and second sleeve support members to the first and second end portions, respectively, of the support cylinder; and means for sealing the annular pressure cavity which comprises:

plug means positionable within the first end portion of the access bore for closing the access bore to gas flow therethrough and for providing a gas-tight seal int he first end portion of the access bore; and second plug means disposable within the second end portion of the access bore for providing a gas-tight seal in the second end portion of the access bore.

14. The flow control valve of claim 13 wherein the collapsible sleeve is fabricated of a reinforced elastomeric material.

15. The flow control valve of claim 13 wherein the plug means comprises:

a first plug member positionable within the first end portion of the access bore so as to form a gas-tight seal therebetween; and a second plug member disposable within the second end portion of the access bore so as to provide a gas-tight seal therebetween.

16. The flow control valve of claim 13 further comprising:
   first sealing means supported by the body portion of the first and second support members for providing a fluid-tight seal between the body portion of the first and second support members and the support cylinder.

17. The flow control valve of claim 16 further comprising:
   second sealing means supported by the support cylinder for providing a fluid-tight seal between the support cylinder and the tubular body member.

18. The flow control valve of claim 16 wherein the collapsible sleeve is fabricated of a cord-reinforced elastomeric material.

19. A flow control valve for use with a tubular body member having a fluid flow passageway extensive therethrough, the tubular body member connectable to a rotatable drill string, the flow control valve adapted to prevent drainage of a fluid from a stand pipe and rotary hose of a drilling rig via the tubular body member when fluid flow through the drill string is interrupted, the flow control valve comprising:
   flow control means supported within the fluid flow passageway of the tubular body member for controlling fluid flow therethrough, the flow control means having an annular pressure cavity such that the flow control means is selectively opened and closed in response to pressure differential between the annular pressure cavity and the pressure of fluid flowing through the flow control means, the flow control means comprising:
   a collapsible sleeve having a first end portion and an opposed second end portion;
   a first sleeve support member adapted to support the first end portion of the collapsible sleeve, the first sleeve support member having a bore extensive therethrough and a plurality of gas-venting passageways for establishing fluid communication between the annular pressure cavity and the bore of the first sleeve support member;
   a second sleeve support member spatially disposed from the first sleeve support member and adapted to support the second end portion of the collapsible sleeve, the second sleeve support member having a bore extensive therethrough and an access bore openly communicating with the annular pressure cavity;
   a support cylinder having a first end portion, a medial portion and an opposed second end portion, the first end portion connected to the first sleeve support member and the second end portion connected to the second sleeve support member such that the medial portion of the support cylinder is disposed in a covering position over the collapsible sleeve the medial portion of the support cylinder and the collapsible sleeve cooperating to define the annular pressure cavity therebetween;
   connector means for connecting the first and second sleeve support members to the first and second end portions, respectively, of the support cylinder;
   means disposed within the access bore for sealing the annular pressure cavity so that the annular pressure cavity can be maintained at a desired pressure resulting from pressurization of the annular pressure cavity;
   means for venting pressure form the annular pressure cavity of the flow control valve means, the means for venting pressure being connected to the first sleeve support member and selectively movable between a first position and a second position, in the first position the means for venting pressure from the annular pressure cavity being disposed in a covering position over the gas-venting passageways so that a gas-tight seal is formed therebetween and the gas-venting passageway are effectively closed so that that gas pressure is maintained within the annular pressure cavity, in the second position the means for venting pressure from the annular pressure cavity being disposed in an noncovering position relative to the gas-venting passageways so that the gas pressure in the annular pressure cavity can be vented therethrough.

* * * * *

UNITED STATES PATENT AND TRADEMARK OFFICE
CERTIFICATE OF CORRECTION

PATENT NO. : 5,205,325
DATED : April 27, 1993
INVENTOR(S) : Britton F. Piper

It is certified that error appears in the above-indentified patent and that said Letters Patent is hereby corrected as shown below:

```
Column 4, line 34, delete "s" and substitute therefor
     --so--;

Column 4, line 61, delete "a" and substitute therefor
     --an--;

Column 11, lines 21 and 22, delete "10 thus" and substitute
     therefor --the--;

Column 14, line 21, delete "and" and substitute therefor
     --an--;

Column 18, line 37, delete "tot he" and substitute therefor
     --to the--; and Column 18, line 52, delete "int he" and substitute therefor
     --in the--.
```

Signed and Sealed this

Nineteenth Day of September, 1995

Attest:

BRUCE LEHMAN

*Attesting Officer*     *Commissioner of Patents and Trademarks*